No. 710,638. Patented Oct. 7, 1902.
J. E. VAN NOSTRAN.
DENTAL CUSPIDOR.
(Application filed Jan. 16, 1902.)
(No Model.)
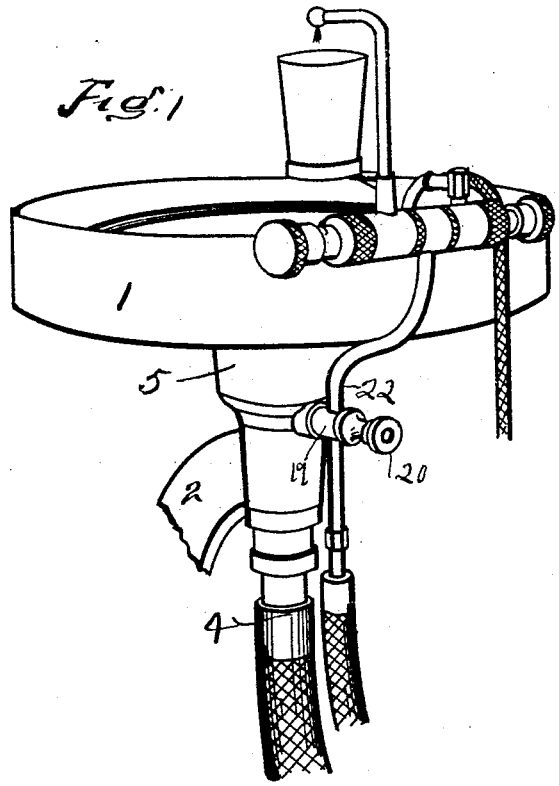
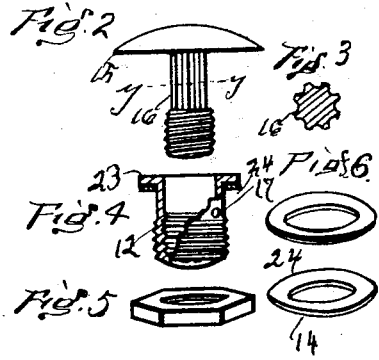
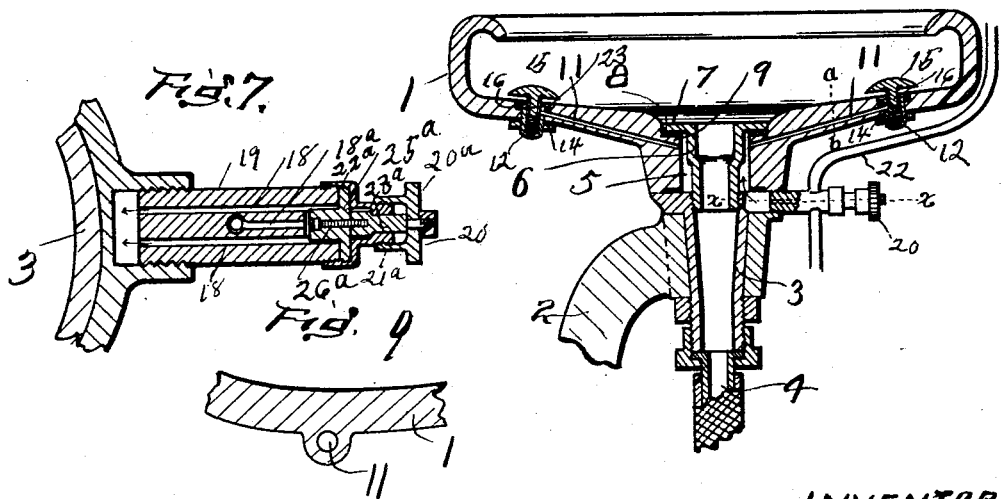
WITNESSES:
E. J. Cross.
J. R. Bond.
INVENTOR
Joseph E. Van Nostran
BY L. W. Bond
ATTY.

UNITED STATES PATENT OFFICE.

JOSEPH E. VAN NOSTRAN, OF CANTON, OHIO.

DENTAL CUSPIDOR.

SPECIFICATION forming part of Letters Patent No. 710,638, dated October 7, 1902.

Application filed January 16, 1902. Serial No. 89,961. (No model.)

*To all whom it may concern:*

Be it known that I, JOSEPH E. VAN NOSTRAN, a citizen of the United States, residing at Canton, in the county of Stark and State of Ohio, have invented certain new and useful Improvements in Dental Cuspidors; and I do hereby declare that the following is a full, clear, and exact description of the same, reference being had to the annexed drawings, making a part of this specification, and to the figures of reference marked thereon, in which—

Figure 1 is a perspective view showing the different parts properly connected. Fig. 2 is a detached view of one of the water-spray caps. Fig. 3 is a transverse section through line $y\ y$, Fig. 2. Fig. 4 is a detached view of one of the water-chamber thimbles, showing the same partly broken. Fig. 5 is a detached view of one of the water-chamber-connecting nuts. Fig. 6 shows detached views of the gaskets. Fig. 7 is a sectional view on line $x\ x$, Fig. 8. Fig. 8 is a vertical section of the bowl cut through the water-chamber thimbles and their different parts. Fig. 9 is a vertical section through line $a\ b$, Fig. 8.

The present invention has relation to dental cuspidors; and it consists in the different parts and combination of parts hereinafter described, and particularly pointed out in the claim.

Similar numerals of reference indicate corresponding parts in all the figures of the drawings.

In the accompanying drawings, 1 represents the bowl, which is of the usual construction, reference being had to my improved devices, and it is supported in proper position by the usual bracket or arm 2, which arm is provided with an eye to receive the downward-extending shank 3, to which downward-extending shank is connected the usual drain-pipe connection 4.

The bowl 1 is provided with the chambered shank 5, which chambered shank has located therein the downward-extending thimble 6, the bottom or lower end of which is screw-threaded and is so formed to connect the top or upper end of the shank 2 thereto. The top or upper end of the thimble 6 is provided with the flange 7, which flange is for the purpose of binding the bowl 1 in the usual manner, and for the purpose of forming a tight joint, the gasket 8 is employed and is located between the bottom of the flange 7 and the top of the shoulder 9, formed in the bowl.

The thimble 6 is formed of a diameter less than the diameter of the chambered shank and is so formed for the purpose of providing a water-passage between the inner periphery of the chambered shank and the outer periphery of the thimble. From the chamber between the inner periphery of the shank and the outer periphery of the thimble 6 extend water-passages 11, which water-passages lead to and communicate with the water-chamber thimbles 12, which water-chambered thimbles are screw-threaded upon their outside and inside, the outer screw-threads being for the purpose of connecting said thimbles to the bowl 1 by means of nuts 13, which nuts are located upon the bottom or under side of the bowl 1 and on the outer screw-threads of the water-chambered thimbles 12, and for the purpose of forming a tight joint the gaskets 14 are employed and are located substantially as shown in Fig. 8.

The water-spray caps 15 are provided with the corrugated shanks 16, the bottom or lower ends of which are screw-threaded and are so formed to provide a means for connecting the water-spray caps to the thimbles 12. Water is conveyed to the thimbles 12 from the passages 11 through the passages 17 and thence upward around the corrugated portions 16 of the water-spray caps 15.

It will be understood that there should be room between the corrugated portions of the water-spray caps 15 and the upper inner portion of the thimbles 12 to allow water to find its way upward along the corrugated portions, and as it moves upward it comes in contact with the caps 15 which passes out between the bottom of the bowl and the bottom of the caps, said caps being located a short distance above the bottom of the bowl, as illustrated in Fig. 8.

It will be understood that by my peculiar arrangement the water supplied to the cuspidor is delivered near the periphery of the bowl at different points, by which arrangement a better distribution of the water is brought about and at the same time the flange 7 can be seated into the central opening of the bowl 1 in a such a manner that it forms no obstruction to the outward passage of the water. Another object and purpose of providing a number of inlet-passages to the bowl is to provide different currents, which currents will travel toward each other, and when they meet they will mingle and the water pass inward on the bottom of the bowl and out at its center.

In the drawings I have illustrated two chambered thimbles 12; but it will be understood that the number may be increased without departing from the nature of my invention, as it would simply be a duplication of the ones here shown.

For the purpose of supplying water to the bowl suitable passages 18 and 18$^a$ are provided in the valve-stem 19, which are controlled by means of the valve-knob 20, which valve-knob is provided with the screw-threaded thimble 20$^a$, said screw-threaded thimble being located on a screw-threaded shank 21$^a$, which screw-threaded shank is extended from the cap 22$^a$. The metal stem 23$^a$ is so located that it can be moved back and forth by the rotation of the knob 20, and when moved inward it will move the valve 25$^a$ against the end of the passage 18$^a$ and cut off the supply of water; but when it is desired to supply water the knob 20 is moved outward and the valve 25$^a$ allowed to be forced away from the end of the passage 18$^a$, at which time water is free to pass into the chambered shank 5.

By forming the valve 25$^a$ of rubber or like material it will be readily seen that the inner end valve can be brought to and from the outlet end of the passage 18$^a$.

For the purpose of supplying water for any other purpose than the use of the cuspidor proper a valve-cylinder 21 is provided and is supported by means of the pipe 22 and is provided with valves and passages, so as to properly regulate the flow of water.

The construction in reference to the regulation of the flow of water for other purposes than that of the cuspidor proper forms no particular part of the present invention, and hence no detail description is here necessary except to illustrate a complete dental cuspidor.

The top or upper ends of the water-chamber thimbles 12 are provided with the flanges 23, which flanges are seated in suitable apertures in the bottom of the bowl, so that their top or upper sides will come flush, or substantially so, with the bottom of the bowl and the gaskets 24, located as illustrated in Fig. 8.

Having fully described my invention, what I claim as new, and desire to secure by Letters Patent, is—

In a dental cuspidor, a bowl provided with a chambered shank, a thimble located in the chambered shank and formed of a diameter less than the diameter of the chamber in the shank, passages formed in the bottom of the bowl and extended toward the periphery of the bowl, chambered thimbles connected to the bottom of the bowl and provided with passages communicating with the passages in the bottom of the bowl, and spray-caps connected to the water-thimbles, substantially as and for the purpose specified.

In testimony that I claim the above I have hereunto subscribed my name in the presence of two witnesses.

JOSEPH E. VAN NOSTRAN.

Witnesses:
GEO. S. COTTON,
J. A. JEFFERS.